US011941077B2

(12) United States Patent
Goto et al.

(10) Patent No.: US 11,941,077 B2
(45) Date of Patent: Mar. 26, 2024

(54) CALCULATING DEVICE, CALCULATION PROGRAM, RECORDING MEDIUM, AND CALCULATION METHOD

(71) Applicant: Kabushiki Kaisha Toshiba, Tokyo (JP)

(72) Inventors: Hayato Goto, Kanagawa (JP); Kosuke Tatsumura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/937,636

(22) Filed: Oct. 3, 2022

(65) Prior Publication Data

US 2023/0025361 A1 Jan. 26, 2023

Related U.S. Application Data

(62) Division of application No. 17/091,004, filed on Nov. 6, 2020, now Pat. No. 11,494,462, which is a division
(Continued)

(30) Foreign Application Priority Data

Feb. 23, 2018 (JP) .................. 2018-030873

(51) Int. Cl.
*G06F 17/11* (2006.01)
*G06F 9/30* (2018.01)
(52) U.S. Cl.
CPC ............ *G06F 17/11* (2013.01); *G06F 9/3001* (2013.01)
(58) Field of Classification Search
CPC ................................ G06F 17/11; G06F 17/12
See application file for complete search history.

(56) References Cited

U.S. PATENT DOCUMENTS 6,148,101 A 11/2000 Tanaka et al.
2017/0104493 A1 4/2017 Goto

FOREIGN PATENT DOCUMENTS

JP H9-212477 A 8/1997
JP 2017-73106 A 4/2017

OTHER PUBLICATIONS

Inagaki et al., "A coherent Ising machine for 2000-node optimization problems," Science (Nov. 2016), 354:603-606 and summary page.

(Continued)

*Primary Examiner* — Emily E Larocque
(74) *Attorney, Agent, or Firm* — Finnegan, Henderson, Farabow, Garrett & Dunner, LLP

(57) ABSTRACT

According to one embodiment, a calculating device includes a processor repeating a processing procedure. The processing procedure includes a first variable update and a second variable update. The first variable update includes updating an ith entry of a first variable $x_i$ by adding a first function to the ith entry of the first variable $x_i$ before the first variable update. The second variable update includes updating the ith entry of the second variable $y_i$ by adding a second function and a third function to the ith entry of the second variable $y_i$ before the second variable update. The processor performs at least an output of at least one of the ith entry of the first variable $x_i$ obtained after the repeating of the processing procedure or a function of the ith entry of the first variable $x_i$ obtained after the repeating of the processing procedure.

20 Claims, 11 Drawing Sheets

Related U.S. Application Data of application No. 16/123,146, filed on Sep. 6, 2018, now Pat. No. 10,860,679.

(56) References Cited

OTHER PUBLICATIONS

Goto, "Bifurcation-based adiabatic quantum computation with a nonlinear oscillator network," Scientific Reports (Feb. 22, 2016), pp. 1-8.

Haribara et al., "Performance evaluation of coherent Ising machines against classical neural networks," Quantum Sci. Techno. 2 (2017), pp. 1-8.

Lucas, "Ising formulations of many NP problems," Frontiers in Physics (Feb. 2014), 2:1-15.

Johnson et al., "Quantum annealing with manufactured spins," Nature (May 12, 2011), 473:194-198.

Goto et al., "Dissipative quantum bifurcation machine: Quantum heating of coupled nonlinear oscillators," arXiv:1707.00986v3 (Jul. 11, 2017), pp. 1-8.

Yamaoka et al., "A 20k-Spin Ising Chip to Solve Combinatorial Optimization Problems With CMOS Anealing," IEEE Journal of Solid-State Circuits (Jan. 2016), 51:303-309.

Matsubara et al., "Ising-Model Optimizer with Parallel-Trial Bit-Sieve Engine," Springer International Publishing AG (2018), pp. 432-438.

Haribara et al., "Performance evaluation of coherent Ising machines against classical neural networks," arXiv:1706.012832v2 (Jun. 13, 2017), pp. 1-11.

Hennessy et al., Computer Architecture: A quantitative approach, Elsevier, 2014 (Year 2014).

Calderhead, Differential Geometric MCMC Methods and Applications, University of Glasgow, Phd Thesis, 2011 (Year 2011).

Blanes et al., Splitting and composition methods in the numerical integration of differential equations, arXiv:0812.0377v1 [math.NA], 2008 (Year: 2008).

Sodurlind, Numerical Methods for Differential Equations, An introduction to Scientific Computing, Springer, 2017 (Year: 2017).

Melchionna, Design of quasisymplectic propagators for Langevin dynamics, J. Chem. Phys. 127, 2007 (Year: 2007).

Simulated Bifurcation Machine (SBM) User Manual, Toshiba Digital Solutions Corporation, Rev 1.01, 2019 (Year: 2019).

Goto et al., Combinatorial optimization adiabatic bifurcations in nonlinear Hamiltonian systems, Science Advances, 5(4), DOI:10.1126/sciadv.aav2372, 2019 (Year: 2019).

Blanes et al., A Concise Introduction to Geometric Numerical Integration, CRC Press, Taylor & Francis Group, 2016 (Year: 2016.

H. Goto et al. "High Performance Combinatorial Optimization Based on Classical Mechanics", Science Advances, Research Article, 2021 (Year 2021).

US 11,941,077 B2

CALCULATING DEVICE, CALCULATION PROGRAM, RECORDING MEDIUM, AND CALCULATION METHOD

CROSS-REFERENCE TO RELATED APPLICATIONS

This application is a divisional of U.S. patent application Ser. No. 17/091,004, filed Nov. 6, 2020, which is a divisional of U.S. patent application Ser. No. 16/123,146, filed Sep. 6, 2018, now U.S. Pat. No. 10,860,679 B2, issued Dec. 8, 2020, which is based upon and claims the benefit of priority from Japanese Patent Application No. 2018-030873, filed on Feb. 23, 2018, the entire contents of which are incorporated herein by reference.

FIELD

Embodiments described herein relate generally to a calculation device, a calculation program, a recording medium, and a calculation method.

BACKGROUND

Optimization problems occur in various social issues. Ising problems are one example of optimization problems. It is desirable to solve large-scale optimization problems quickly.

DETAILED DESCRIPTION

Figure 1:
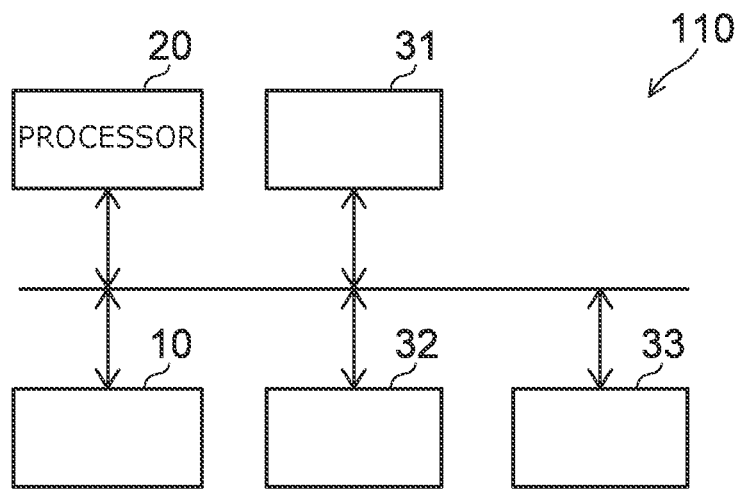
FIG. 1 is a schematic view showing an example of a calculating device according to an embodiment.

According to one embodiment, a calculating device includes a processor configured to perform repeating a processing procedure. The processing procedure includes a first variable update and a second variable update. The first variable update includes updating an ith entry of a first variable $x_i$ by adding a first function to the ith entry of the first variable $x_i$ before the first variable update (i being an integer not less than 1 and not more than N, and N being an integer of 2 or more). The ith entry of the first variable $x_i$ is one of a first variable set $\{x\}$. A variable of the first function includes the ith entry of a second variable $y_i$. The ith entry of the second variable $y_i$ is one of a second variable set $\{y\}$. The second variable update includes updating the ith entry of the second variable $y_i$ by adding a second function and a third function to the ith entry of the second variable $y_i$ before the second variable update. A variable of the second function includes the ith entry of the first variable $x_i$. A variable of the third function includes at least a part of a first parameter set $\{J\}$ and at least a part of the first variable set $\{x\}$. The processor outputs at least one of the ith entry of the first variable $x_i$ obtained after the repeating of the processing procedure or a function of the ith entry of the first variable $x_i$ obtained after the repeating of the processing procedure.

According to another embodiment, a calculation program causes a computer to perform repeating a processing procedure. The processing procedure includes a first variable update and a second variable update. The first variable update includes updating an ith entry of a first variable $x_i$ by adding a first function to the ith entry of the first variable $x_i$ before the first variable update (i being an integer not less than 1 and not more than N, and N being an integer of 2 or more). The ith entry of the first variable $x_i$ is one of a first variable set $\{x\}$. A variable of the first function includes the ith entry of a second variable $y_i$. The ith entry of the second variable $y_i$ is one of a second variable set $\{y\}$. The second variable update includes updating the ith entry of the second variable $y_i$ by adding a second function and a third function to the ith entry of the second variable $y_i$ before the second variable update. A variable of the second function includes the ith entry of the first variable $x_i$. A variable of the third function includes at least a part of a first parameter set $\{J\}$ and at least a part of the first variable set $\{x\}$. The computer outputs at least one of the ith entry of the first variable $x_i$ obtained after the repeating of the processing procedure or a function of the ith entry of the first variable $x_i$ obtained after the repeating of the processing procedure.

According to another embodiment, a recording medium is computer-readable, a calculation program is recorded in the recording medium, the calculation program causes a computer to perform repeating a processing procedure. The processing procedure includes a first variable update and a second variable update. The first variable update includes updating an ith entry of a first variable $x_i$ by adding a first function to the ith entry of the first variable $x_i$ before the first variable update (i being an integer not less than 1 and not more than N, and N being an integer of 2 or more). The ith entry of the first variable $x_i$ is one of a first variable set $\{x\}$. A variable of the first function includes the ith entry of a second variable $y_i$. The ith entry of the second variable $y_i$ is one of a second variable set $\{y\}$. The second variable update includes updating the ith entry of the second variable $y_i$ by adding a second function and a third function to the ith entry of the second variable $y_i$ before the second variable update. A variable of the second function includes the ith entry of the first variable $x_i$. A variable of the third function includes at least a part of a first parameter set $\{J\}$ and at least a part of the first variable set $\{x\}$. The computer outputs at least one of the ith entry of the first variable $x_i$ obtained after the repeating of the processing procedure or a function of the ith entry of the first variable $x_i$ obtained after the repeating of the processing procedure.

According to another embodiment, a calculation method includes repeating a processing procedure. The processing procedure includes a first variable update and a second variable update. The first variable update includes updating an ith entry of a first variable $x_i$ by adding a first function to the ith entry of the first variable $x_i$ before the first variable update (i being an integer not less than 1 and not more than N, and N being an integer of 2 or more). The ith entry of the first variable $x_i$ is one of a first variable set $\{x\}$. A variable of the first function includes the ith entry of a second variable $y_i$. The ith entry of the second variable $y_i$ is one of a second variable set $\{y\}$. The second variable update includes updating the ith entry of the second variable $y_i$ by adding a second function and a third function to the ith entry of the second variable $y_i$ before the second variable update. A variable of the second function includes the ith entry of the first variable $x_i$. A variable of the third function includes at least a part of a first parameter set $\{J\}$ and at least a part of the first variable set $\{x\}$. The calculation method includes outputting at least one of the ith entry of the first variable $x_i$ obtained after the repeating of the processing procedure or a function of the ith entry of the first variable $x_i$ obtained after the repeating of the processing procedure.

Various embodiments will be described hereinafter with reference to the accompanying drawings.

In the specification and drawings, components similar to those described or illustrated in a drawing thereinabove are marked with like reference numerals, and a detailed description is omitted as appropriate.

First Embodiment

FIG. 1 is a schematic view showing an example of a calculating device according to an embodiment.

As shown in FIG. 1, the calculating device 110 according to the embodiment includes, for example, a processor 20 and a storage 10. The processor 20 includes, for example, a CPU (Central Processing Unit), etc. The processor 20 includes, for example, an electronic circuit, etc. The storage 10 can store various data. The storage 10 is, for example, memory. The storage 10 may include at least one of ROM (Read Only Memory) or RAM (Random Access Memory). The calculating device 110 may be a calculation system.

In the example, an acquisition part 31 is provided in the calculating device 110. For example, the acquisition part 31 can acquire various data. The acquisition part 31 includes, for example, an I/O port, etc. The acquisition part 31 may have the function of an outputter. For example, the acquisition part 31 may have communication functions.

As shown in FIG. 1, the calculating device 110 may include an operation part 32, a display part 33, etc. The operation part 32 may include, for example, a device having an operation function (e.g., a keyboard, a mouse, a touch input panel, a voice recognition input device, etc.). The display part 33 may include various displays.

The multiple elements that are included in the calculating device 110 can communicate with one another by at least one of wireless or wired methods. The locations where the multiple elements included in the calculating device 110 are provided may be different from one another. For example, a general-purpose computer may be used as the calculating device 110. For example, multiple computers that are connected to one another may be used as the calculating device 110. A dedicated circuit may be used as at least a part of the calculating device 110 (e.g., the processor 20, the storage 10, etc.). For example, multiple circuits that are connected to one another may be used as the calculating device 110.

Examples of the multiple elements included in the calculating device 110 are described below.

An example of an operation performed by the calculating device 110 according to the embodiment will now be described.

Figure 2:
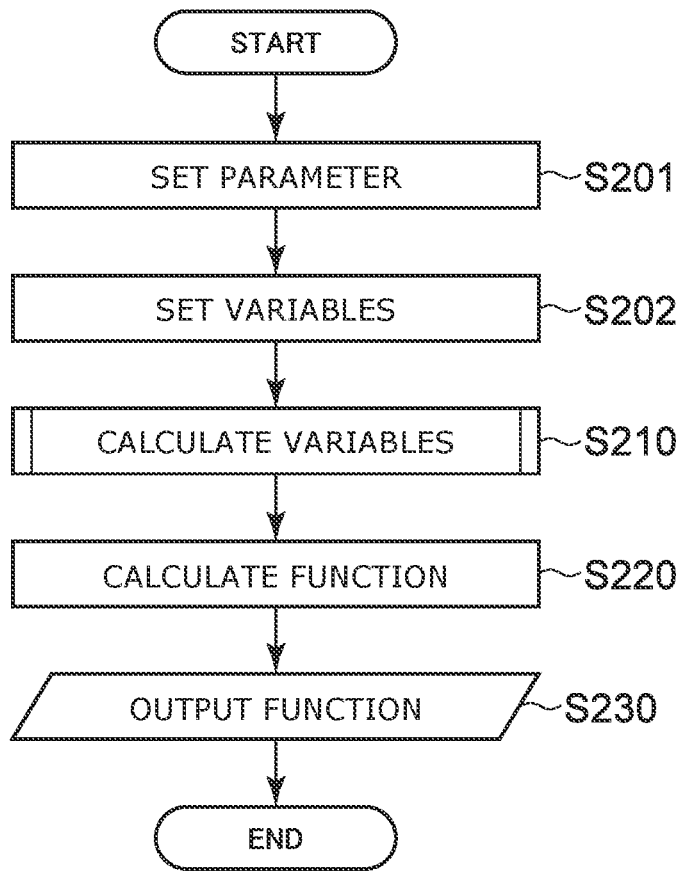
FIG. 2 is a flowchart illustrating the operation of the calculating device according to the embodiment.

FIG. 2 is a flowchart illustrating the operation of the calculating device according to the embodiment.

As shown in FIG. 2, a parameter is set (step S201). The parameter includes, for example, a first parameter set $\{J\}$. The parameter may further include, for example, a second parameter set $\{h\}$. Examples of these parameters are described below.

Multiple variables are set (step S202). The variables include, for example, a first variable set $\{x\}$ and a second variable set $\{y\}$. The variables are initialized to appropriate values in step S202. Examples of the initialization are described below.

Calculations (e.g., updating) of the multiple variables are performed (step S210). For example, the time evolution is calculated for the multiple variables. For example, the first variable set $\{x\}$ is updated; and the second variable set $\{y\}$ is updated. These calculations are repeated until the prescribed conditions (described below) are satisfied. Step S210 is, for example, a subroutine.

After the subroutine (the update of the variables), for example, a function is calculated (step S220). For example, a function of at least one element included in the first variable set $\{x\}$ is calculated. In one example, this function is the sign of at least one element included in the first variable set $\{x\}$.

This function is output (step S230). For example, in one example, the sign of at least one element included in the first variable set $\{x\}$ is output. In step S230, at least one element included in the first variable set $\{x\}$ after the update may be output. In such a case, step S220 may be omitted.

In the embodiment, in the above calculations of the multiple variables (step S210), for example, the update of the first variable set $\{x\}$ is performed using the second variable set $\{y\}$. Then, the update of the second variable set $\{y\}$ is performed using the first variable set $\{x\}$. These updates are performed multiple times. In one example, in one of the multiple updates, the update of the second variable set $\{y\}$ is performed after the update of the first variable set $\{x\}$. In one other example, for example, in one of the multiple updates, the update of the first variable set $\{x\}$ is performed after the update of the second variable set $\{y\}$.

An optimization problem can be calculated quickly by the calculating device 110. The optimization problem is, for example, a combinatorial optimization problem (e.g., a discrete optimization problem). For example, a large-scale Ising problem can be solved quickly.

An Ising problem will now be described as an example of a calculation performed by the calculating device 110.

For example, an Ising energy $E_{Ising}$ is represented by the following first formula.

[Formula 1]

$$E_{Ising} = -\frac{1}{2}\sum_{i=1}^{N}\sum_{j=1}^{N}J_{i,j}s_i s_j + \sum_{i=1}^{N}h_i s_i \qquad (1)$$

In the first formula, "N" is the number of Ising spins. "$s_i$" is the ith Ising spin. For example, "$s_i$"=±1. For example, "J" is one matrix. One example of the first parameter set $\{J\}$ above is the matrix J. The matrix J is a real symmetric matrix. In the real symmetric matrix, all of the diagonal entries (the diagonal elements) are zero.

A classical model of a quantum bifurcation machine (hereinbelow, called a classical bifurcation machine) is proposed for the first formula above. The equations of motion for the classical bifurcation machine are provided by the following second to fourth formulas.

[Formula 2]

$$\frac{dx_i}{dt} = \frac{\partial H}{\partial y_i} - y_i\{D + p(t) + K(x_i^2 + y_i^2)\} - c\sum_{j=1}^{N} J_{i,j} y_j \quad (2)$$

[Formula 3]

$$\frac{dy_i}{dt} = -\frac{\partial H}{\partial x_i} = x_i\{-D + p(t) - K(x_i^2 + y_i^2)\} - ch_i a(t) + c\sum_{j=1}^{N} J_{i,j} x_j \quad (3)$$

[Formula 4]

$$H = \sum_{i=1}^{N}\left[\frac{D}{2}(x_i^2 + y_i^2) - \frac{p(t)}{2}(x_i^2 - y_i^2) + \right.$$

$$\left. \frac{K}{4}(x_i^2 + y_i^2)^2 + ch_i x_i a(t) - \frac{c}{2}\sum_{j=1}^{N} J_{i,j}(x_i x_j + y_i y_j)\right] \quad (4)$$

In the second to fourth formulas, "N" corresponds to, for example, the number of Ising spins. For example, "D" corresponds to "detuning." "c" is a constant. For example, "p" corresponds to the "pump rate." For example, "K" corresponds to the "Kerr coefficient." For example, these values may be preset. The second parameter set {h} may not be provided in the second to fourth formulas. In such a case, the terms that include elements of {h} in the third formula and the fourth formula are ignored.

In the second to fourth formulas above, the sign "±1" of the final value of "$x_i$" becomes the Ising spin "$s_i$" of the optimal solution (the ground state) when p(t) is increased from zero to a sufficiently large value. "a(t)" is a parameter that increases with "p(t). For example, "a(t)" is represented by the following fifth formula.

$$\alpha(t) = \sqrt{p(t)/K} \quad [\text{Formula 5}]$$

The above classical bifurcation machine can be considered to be a Hamiltonian dynamical system described by the second to fourth formulas in which "H" is the Hamiltonian.

On the other hand, simulated annealing is known. A sequential update algorithm is employed in this method. In the sequential update algorithm, multiple spins are updated one by one at a time. Such a sequential update algorithm is not suitable for parallel computation.

Conversely, the equations of motion for the classical bifurcation machine above can be solved by discrete solution methods using digital computers. This algorithm is different from simulated annealing and is a parallel update algorithm. Multiple variables can be updated simultaneously in the parallel update algorithm. Therefore, speedup by parallel computation can be expected.

The approach that uses the second to fifth formulas above has the following problems. A calculation that uses the matrix J, which is the most computation-intensive, is necessary to update both the first variable x and the second variable y. Because the above equations of motion cannot be numerically solved easily, for example, it is necessary to use a discrete solution method (e.g., a fourth-order Runge-Kutta method, etc.) requiring a large calculation amount.

On the other hand, in the embodiment, for example, instead of the simultaneous ordinary differential equations shown in the second to fourth formulas, the simultaneous ordinary differential equations shown in the following sixth to eighth formulas are used.

[Formula 6]

$$\frac{dx_i}{dt} = \frac{\partial H'}{\partial y_i} = D y_i \quad (6)$$

[Formula 7]

$$\frac{dy_i}{dt} = -\frac{\partial H'}{\partial x_i} = \{-D + p(t) - K x_i^2\} x_i - ch_i a(t) + c\sum_{j=1}^{N} J_{i,j} x_j \quad (7)$$

[Formula 8]

$$H' = \sum_{i=1}^{N}\left[\frac{D}{2}(x_i^2 + y_i^2) - \frac{p(t)}{2}x_i^2 + \frac{K}{4}x_i^4 + ch_i a(t) - \frac{c}{2}\sum_{j=1}^{N} J_{i,j} x_i x_j\right] \quad (8)$$

In the sixth to eighth formulas, for example, "N" corresponds to the number of Ising spins. For example, "D" corresponds to the "detuning." "c" is a constant. For example, "p" corresponds to the "pump rate" (e.g., an operation parameter). For example, "K" corresponds to the "Kerr coefficient." For example, these values may be preset. The second parameter set {h} may not be provided in the sixth to eighth formulas. In such a case, the terms that include the element of {h} in the seventh formula and the eighth formula are ignored.

A product-sum operation that relates to the matrix J, which is the most computation-intensive, is performed only in the update of the second variable y and is not performed in the update of the first variable x. Accordingly, the calculation amount is reduced. In these formulas, the time derivative of the first variable x includes the second variable y. For example, the time derivative of the first variable x does not include the first variable x. The time derivative of the second variable y includes the first variable x. For example, the time derivative of the second variable y does not include the second variable y. x and y are separate from each other in the Hamiltonian. Therefore, a stable discrete solution method in which the calculation amount is small is applicable. For example, a method called a symplectic Euler method is applicable. In the sixth to eighth formulas above, "p" is eliminated from the time derivative of "x."

In the case where such a method is used, it was found that high performance (e.g., high accuracy) can be maintained. In the calculating device according to the embodiment, the equations of motion for the Hamiltonian dynamical system (a new classical bifurcation machine) with the above separable Hamiltonian is solved using, for example, a symplectic Euler method. The calculating device according to the embodiment is configured to execute the calculation of such a new algorithm as quickly as possible by parallel computation.

In the embodiment, for example, the sign ("±1") of the final value of the first variable $x_i$ becomes the Ising spin si of the optimal solution (the ground state) when "p(t)" is increased from zero to a sufficiently large value.

For example, the first variable $x_i$ and the second variable $y_i$ are initialized to appropriate values in the setting of the variables (step S202). For example, these variables are initialized randomly using random numbers having absolute values of 0.1 or less.

Several examples of step S210 (referring to FIG. 2) will now be described.

Figure 3:
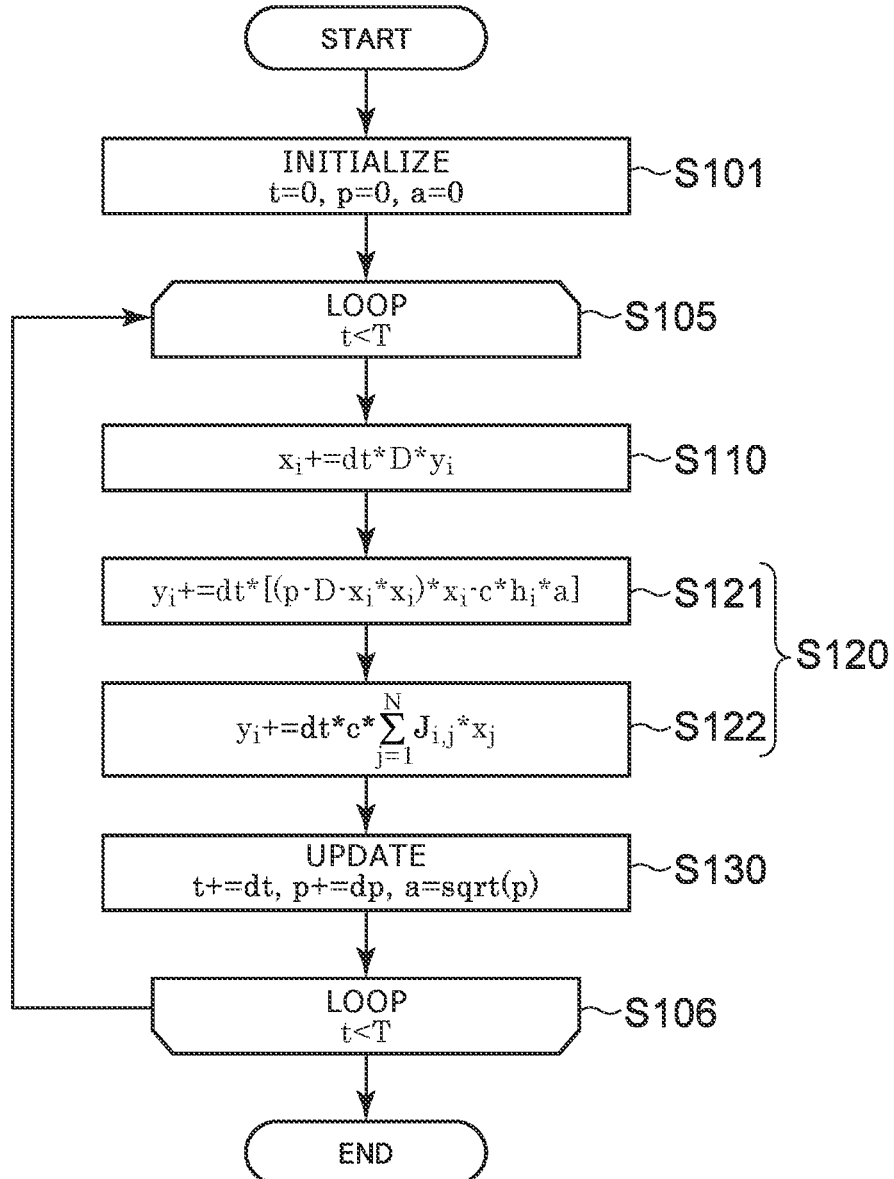
FIG. 3 is a flowchart illustrating a part of the operation of the calculating device according to the embodiment.

FIG. 3 is a flowchart illustrating a part of the operation of the calculating device according to the embodiment.

FIG. 3 illustrates step S210. The formulas shown in FIG. 3 are examples. As shown in FIG. 3, "t," "p," and "a" are initialized (step S101). In one example, "t," "p," and "a" are set to 0. "T" corresponds to the final value of time t. "dt" is the increment per step of the time t. "dp" is the increment per step of the parameter p.

When "t" is smaller than "T," the processing of the loop including a series of processing described below (repeating the procedure) is performed (step S105). For example, the processing of the loop may be performed when "p" is smaller than "P" that is preset appropriately.

The update of the ith entry of the first variable $x_i$ is performed (step S110). For example, the first variable $x_i$ after the update is set to the value obtained by adding $dt*D*y_i$ to the first variable $x_i$ before the update. Here, "*" is the product notation. The first variable $x_i$ before the update corresponds to the previous value of the first variable $x_i$.

The update of the ith entry of the second variable $y_i$ is performed (step S120). In the example, the update using the first variable set $\{x\}$ (step S121) and the update using the first parameter $\{J\}$ and the first variable set $\{x\}$ (step S122) are performed. The order of step S121 and step S122 is interchangeable. At least a part of step S121 and at least a part of step S122 may be performed simultaneously. For example, step S121 corresponds to a first sub-update. Step S122 corresponds to a second sub-update.

In the first sub-update, for example, the second variable $y_i$ after the update is set to the value obtained by adding $dt*((p-D-x_i*x_i)*x_i-c*h_i*a)$ to the second variable $y_i$ before the update.

In the second sub-update, for example, the second variable $y_i$ after the update is set to the value obtained by adding $dt*c*\Sigma(J_{i,j}*x_j)$ to the second variable $y_i$ before the update. "$\Sigma$" represents the sum over j. For example, "$dt*c*J$" may be defined as the J matrix. In such a case, the operation of "$dt*c*$" may not actually be performed.

Update processing of the parameters for the update is performed (step S130). Namely, "t" after the update is set to the value obtained by adding "dt" to "t" before the update. "p" after the update is set to the value obtained by adding "dp" to "p" before the update. For example, "a" is $p^{1/2}$.

Then, when "t" is smaller than "T," the flow returns to step S105 (step S106). For example, the flow may return to step S105 when "p" is smaller than "P" which is preset appropriately.

When "t" is "T" or more, the update ends; and the flow proceeds to step S220 or step S230 shown in FIG. 2.

Figure 4:
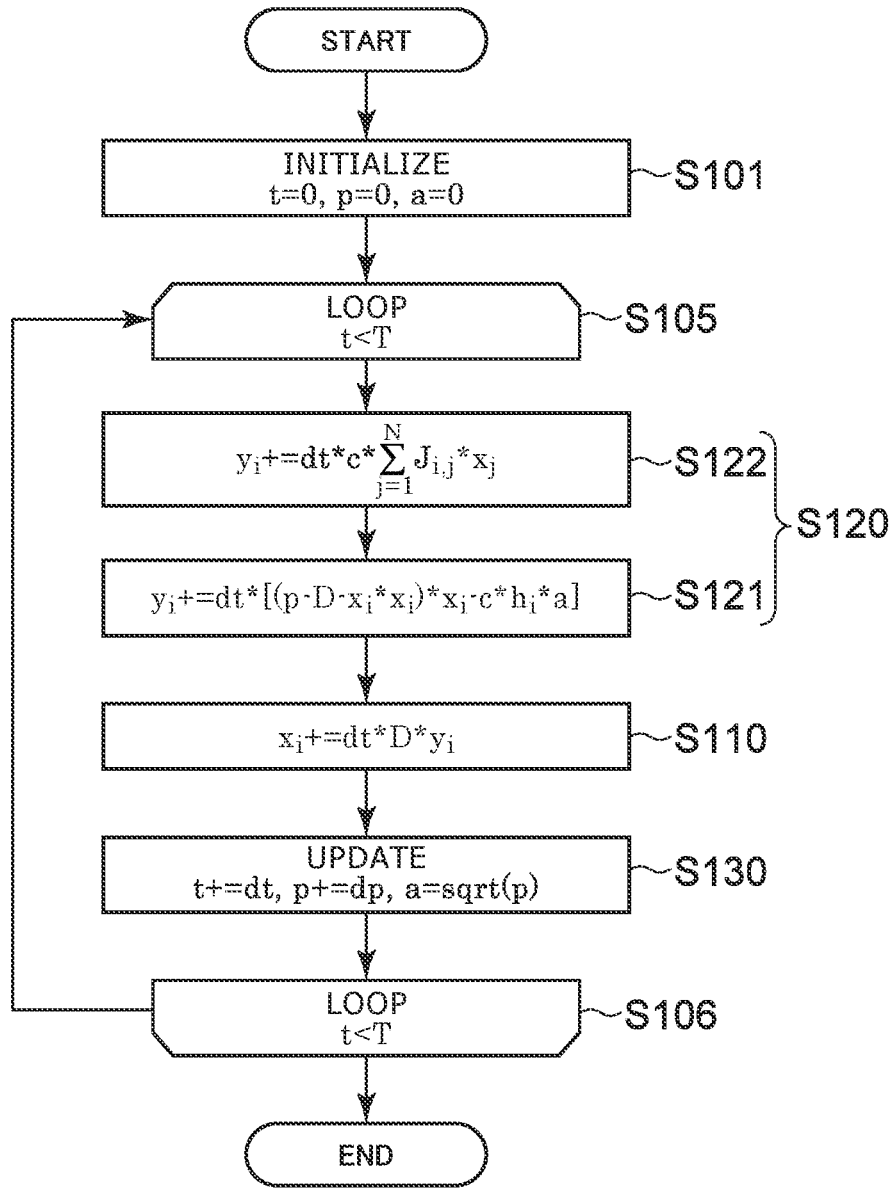
FIG. 4 is a flowchart illustrating a part of the operation of the calculating device according to the embodiment.

FIG. 4 is a flowchart illustrating a part of the operation of the calculating device according to the embodiment.

FIG. 4 illustrates step S210. In the example shown in FIG. 4, step S120 is performed before step S110 in the processing of one loop. Thus, the order of step S110 and step S120 is arbitrary.

In one example, "K" is set to 1. For example, "N," "D," "c," "T," "dt," and "dp" can be preset to appropriate values.

In the examples of FIG. 3 and FIG. 4, a linear increase is applied in the update of "p." In the embodiment, any increasing function may be used in the update of "p." In the embodiment, there are two types of update methods, as mentioned above. Namely, in one update method, the second variable $y_i$ is updated using the updated value of the first variable $x_i$ after the update of the first variable $x_i$. In the other update method, the first variable $x_i$ is updated using the updated value of the second variable $y_i$ after the update of the second variable $y_i$. These two methods correspond respectively to FIG. 3 and FIG. 4.

Thus, in the calculating device 110 according to the embodiment, the processor 20 (referring to FIG. 1) repeats the processing procedure (step S210: referring to FIG. 2). The processing procedure includes, for example, the first variable update (step S110) and the second variable update (step S120).

The first variable update includes updating the ith entry of the first variable $x_i$ by adding the first function to the ith entry of the first variable $x_i$ before the first variable update (i being an integer not less than 1 and not more than N, and N being an integer of 2 or more). The ith entry of the first variable $x_i$ is one of the first variable set $\{x\}$. The variable of the first function includes the ith entry of the second variable $y_i$. The ith entry of the second variable $y_i$ is one of the second variable set $\{y\}$.

The second variable update includes updating the ith entry of the second variable $y_i$ by adding the second function and the third function to the ith entry of the second variable $y_i$ before the second variable update. The variable of the second function includes the ith entry of the first variable $x_i$. The variable of the third function includes at least a part of the first parameter set $\{J\}$ and at least a part of the first variable set $\{x\}$.

Then, the processor 20 outputs at least one of the ith entry of the first variable $x_i$ obtained after repeating the above processing procedure or a function of the ith entry of the first variable $x_i$ obtained after repeating the above processing procedure. For example, at least one of any first variable included in the first variable set $\{x\}$ or a function of any first variable obtained after repeating the processing procedure is output. For example, at least one of all of the first variables included in the first variable set $\{x\}$ or all the functions each of which includes each first variable obtained after repeating the processing procedure may be output.

In the embodiment, the first function above is independent of the first variable set $\{x\}$. The value of the first function does not change even in the case where the values of the first variable set $\{x\}$ are modified. The second function above is independent of the second variable set $\{y\}$. The value of the second function does not change even in the case where the values of the second variable set $\{y\}$ are modified. The third function above is independent of the second variable set $\{y\}$. The value of the third function does not change even in the case where the values of the second variable set $\{y\}$ are modified.

The first function is, for example, $dt*D*y_i$ (e.g., referring to FIG. 3). The second function is, for example, $dt*((p-D-x_i*x_i)*x_i-c*h_i*a)$ (e.g., referring to FIG. 3). The third function is, for example, $dt*c*\Sigma(J_{i,j}*x_j)$ (e.g., referring to FIG. 3).

In one of the processing procedures above that is performed repeatedly in the embodiment, the second variable update may be performed after the first variable update. Or, the first variable update may be performed after the second variable update.

The algorithm that is performed by the calculating device according to the embodiment includes, for example, the following.

For example, the matrix J (one example of the first parameter set $\{J\}$) is acquired. Or, the matrix J is determined by a calculation. The matrix J is, for example, a parameter of an Ising model. At this time, the vector h (one example of the second parameter set $\{h\}$) may be further acquired. Or, the vector h may be determined by a calculation. Two types of variables (the first variable set {x} and the second variable set {y}) are used. The update of the variables in one variable set uses the values in the other variable set. The values in one variable set are not used in the update of the variables in the other variable set. After the update of one variable set, the other variable set is updated using the updated values of the one variable set.

The second function above includes, for example, a fourth function which is a nonlinear function of the ith entry of the first variable $x_i$. The fourth function also includes the operation parameter "p." "p" changes with the update of the two types of variables.

The number of real roots of the fourth function above changes when "p" changes with the update of the two types of variables. The "real root of the function" is the value (the real number) of the variable when the value of the function becomes zero. In the second variable update, in the case where only the fourth function is considered, the real roots of the fourth function correspond to the fixed points of a nonlinear dynamical system. (In a Hamiltonian dynamical system, the fixed points correspond to extreme values of the Hamiltonian). Therefore, a change of the number of real roots of the fourth function corresponds to a change of the number of fixed points. This corresponds to bifurcation phenomena in the nonlinear dynamical system. In the algorithm used in the calculating device according to the embodiment, the initial values of the variables are set to be near one of the stable fixed points at the initial time. Bifurcations are caused by changing "p." The multiple stable fixed points after the bifurcation correspond to the discrete variables of the combinatorial optimization to be solved, where the values of the variables change toward the vicinity of one of the multiple stable fixed points. Thereby, the combinatorial optimization problem is solved using the bifurcation phenomenon. For example, in the above example, each x value at the stable fixed points after the bifurcation is the two positive and negative values; and the sign of each x value is associated with each Ising spin (the discrete variables of the Ising problem). Because the initial stable fixed point is the origin, the initial value of each x and the initial value of each y are set to values near the origin (that is, small random numbers having absolute values of 0.1 or less).

The fourth function is, for example, $dt*(p-D'-x_i*x_i)*x_i$. "D'" is an appropriate constant satisfying $0 \leq D' \leq D$. At the initial time, p=0; and $x_i=0$ is the only root of the fourth function; but when p becomes larger than D', there are three roots; and the two positive and negative roots are associated with the Ising spin. For example, in the case where the second function is set to $dt*((p-D-x_i*x_i)*x_i-c*h_i*a)$, the second function can be expressed as the sum of the fourth function and a linear function, e.g., $dt*(p-D'-x_i*x_i)*x_i+dt*(-(D-D')*x_i-c*h_i*a)$. Accordingly, the second function includes the fourth function.

The fourth function above is, for example, a cubic function. For example, the calculations are easier by such processing than by calculations using a nonlinear function (e.g., a sigmoid function) used in neural networks.

In the embodiment, the calculations become faster by increasing the time step (e.g., "dt"). On the other hand, the calculations become unstable when the time step is increased excessively. By considering this, the time step may be increased in a part of the calculations; and the time step may be reduced in another part of the calculations. For example, a large time step is applicable to the update including the product-sum operation of the matrix J and the first variable x having the large calculation amount. A small time step is applicable to the other updates. Thereby, further speedup is possible.

Examples in the case where such a calculation is performed will now be described.

Figure 5:
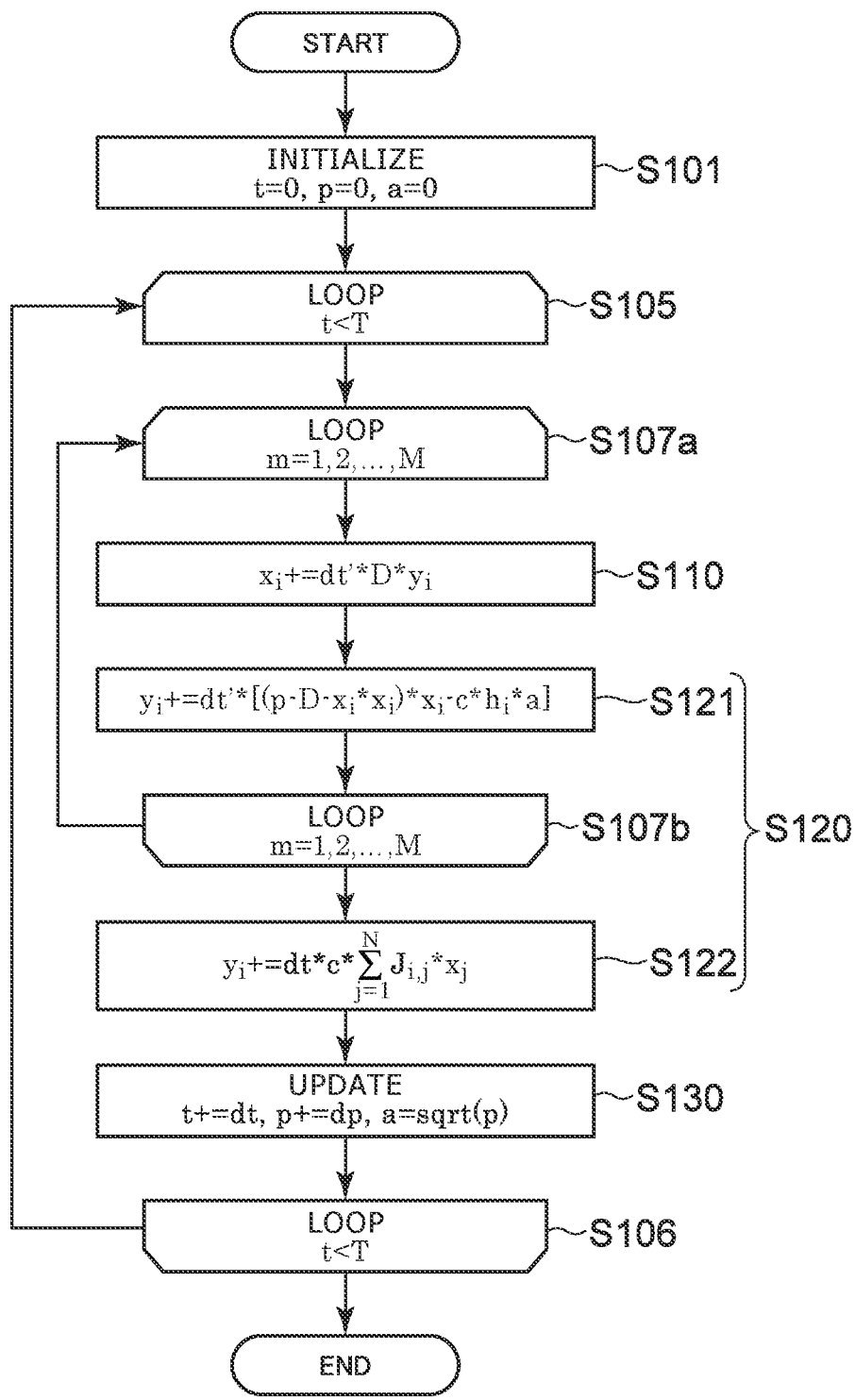
FIG. 5 is a flowchart illustrating a part of the operation of the calculating device according to the embodiment.

FIG. 5 is a flowchart illustrating a part of the operation of the calculating device according to the embodiment.

FIG. 5 illustrates step S210. In the example shown in FIG. 5, a small loop (step S107a to step S107b) is provided inside one loop (step S105 to step S106). In step S107a, the loop variable "m" is not less than 1 and not more than M. Step S110 and step S121 are repeated M times inside the small loop. The order of step S110 and step S121 is interchangeable. Subsequently, the flow proceeds to step S122.

In the example of FIG. 5, step S122 is performed after step S110 and step S121 are repeated.

Figure 6:
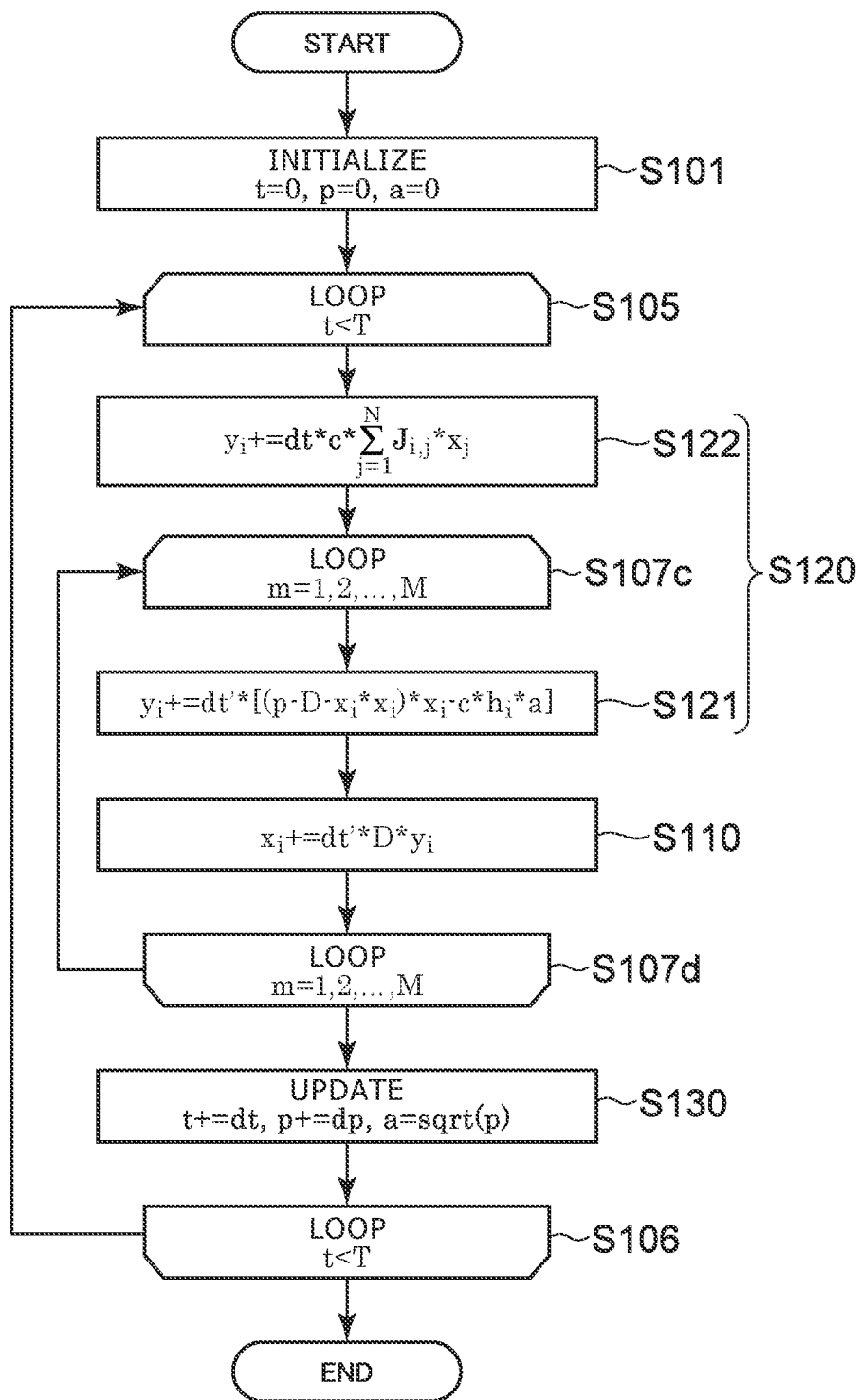
FIG. 6 is a flowchart illustrating a part of the operation of the calculating device according to the embodiment.
Figure 7:
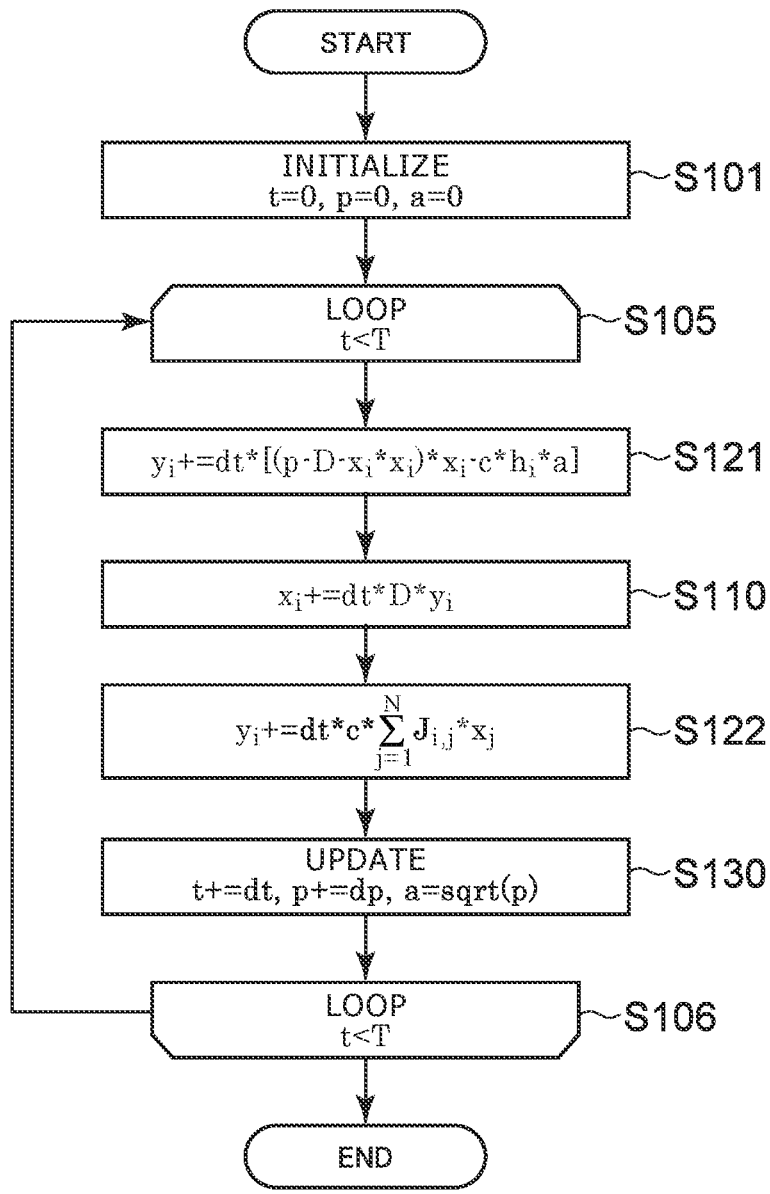
FIG. 7 is a flowchart illustrating a part of the operation of the calculating device according to the embodiment.
Figure 8:
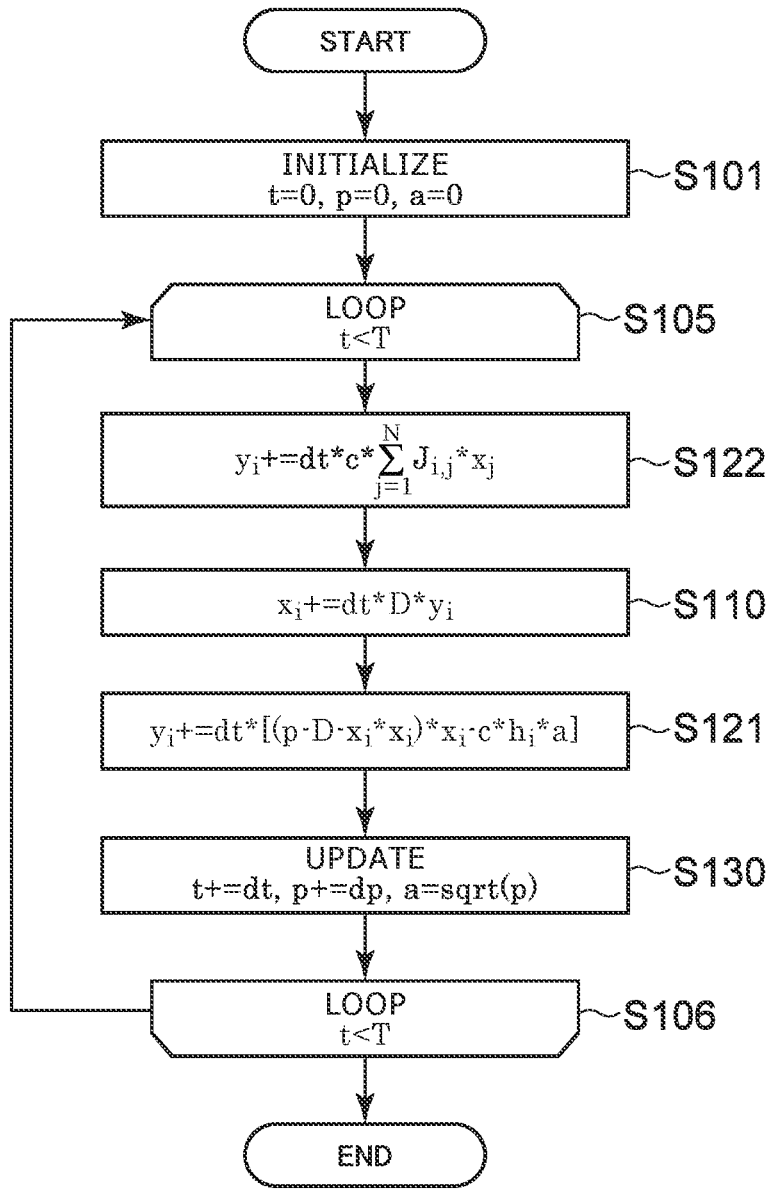
FIG. 8 is a flowchart illustrating a part of the operation of the calculating device according to the embodiment.
Figure 9:
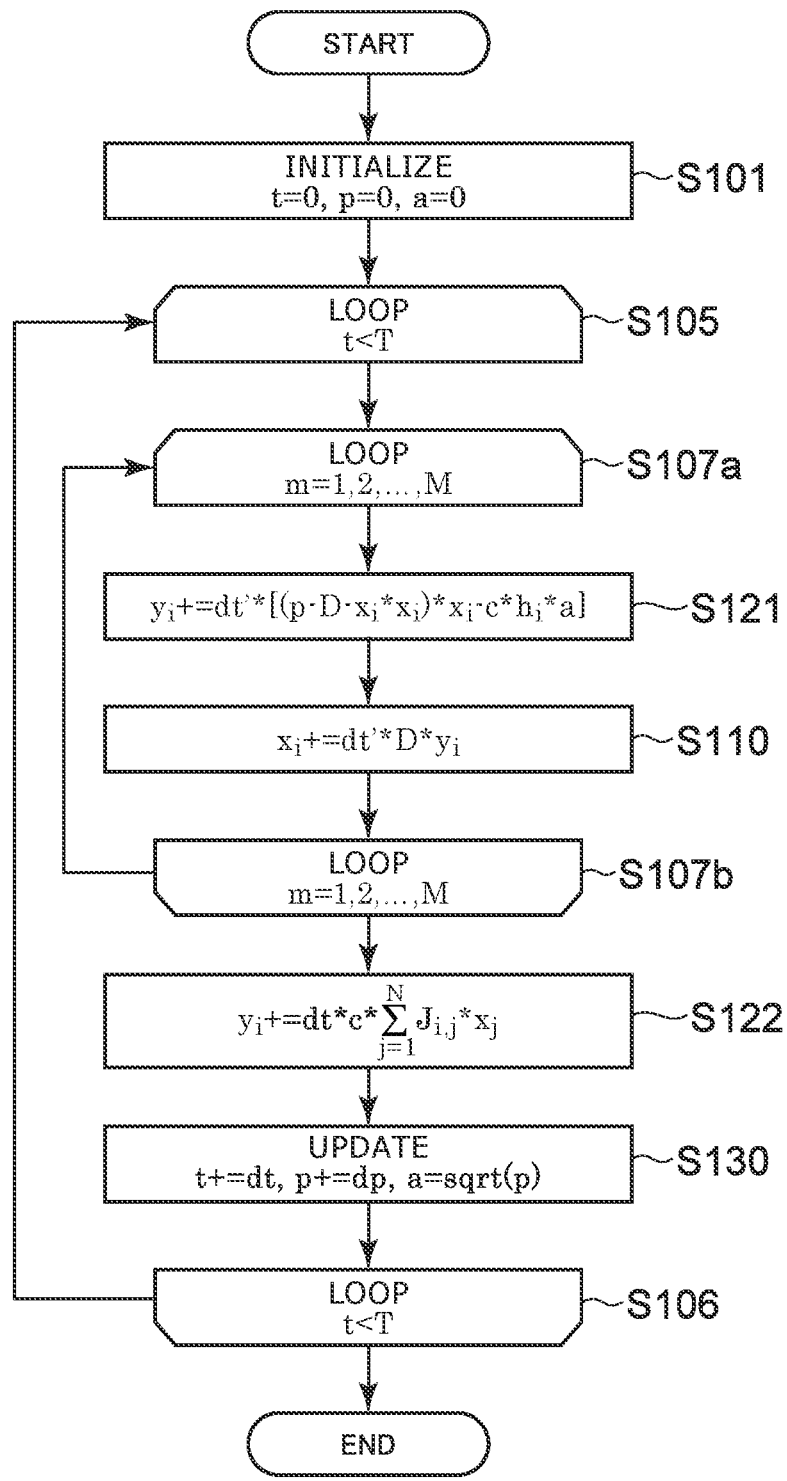
FIG. 9 is a flowchart illustrating a part of the operation of the calculating device according to the embodiment.
Figure 10:
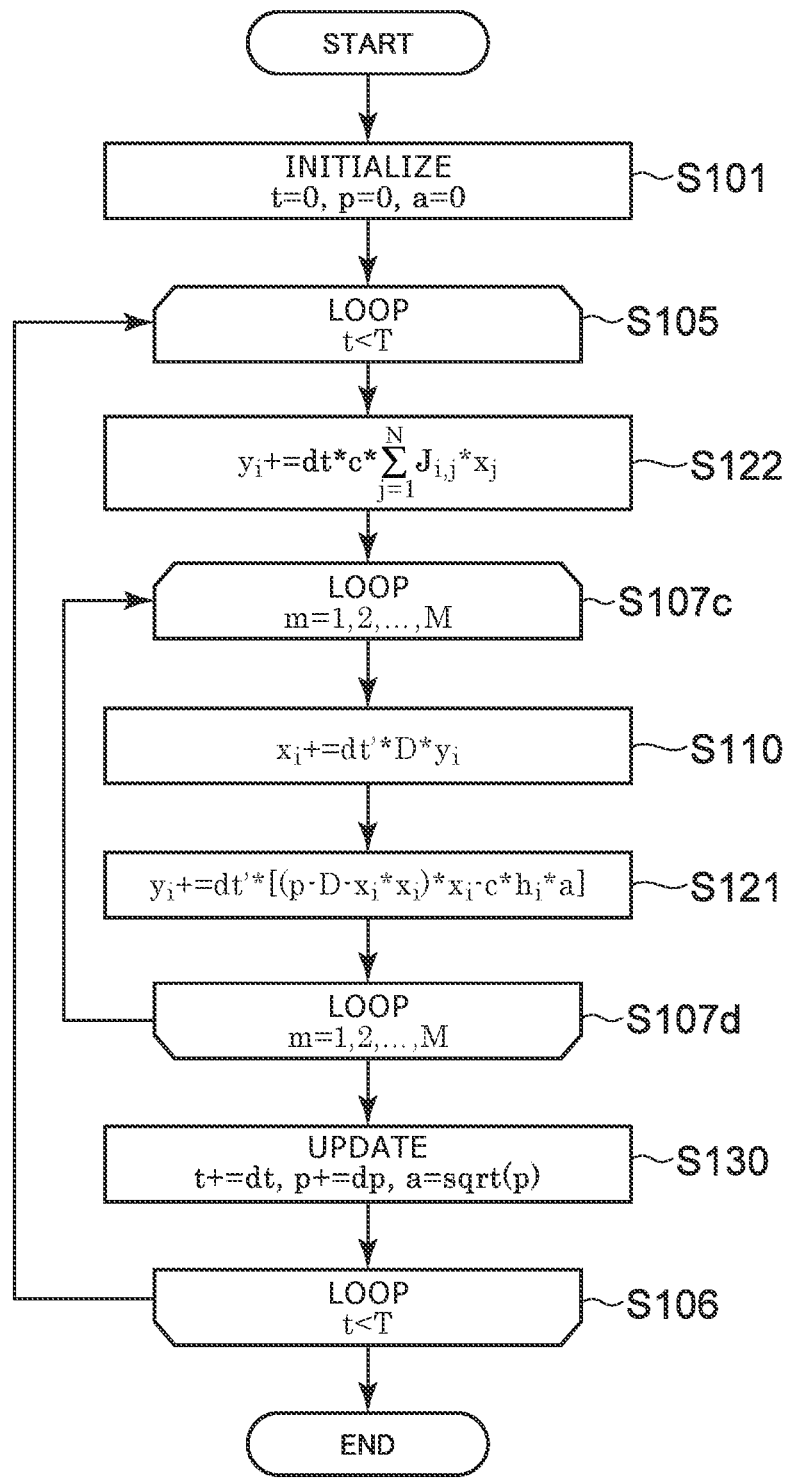
FIG. 10 is a flowchart illustrating a part of the operation of the calculating device according to the embodiment.

FIG. 6 is a flowchart illustrating a part of the operation of the calculating device according to the embodiment.

FIG. 6 illustrates step S210. In the example shown in FIG. 6 as well, a small loop (step S107c to step S107d) is provided inside one loop (step S105 to step S106). In step S107a, the loop variable "m" is not less than 1 and not more than M. The small loop (the repetition of step S121 and step S110) is performed after step S122 is performed. Step S121 and step S110 are repeated M times inside the small loop. The order of step S121 and step S110 is interchangeable.

In the example of FIG. 5, the update of the second variable $y_i$ is performed after the update of the first variable $x_i$. In the example of FIG. 6, the update of the first variable $x_i$ is performed after the update of the second variable $y_i$. For example, the time step "dt" of the update not including the product-sum operation relating to the matrix J is set to "dt/M." On the other hand, in the one update (the large loop) including the product-sum operation relating to the matrix J, the small loop (the update not including the product-sum operation relating to the matrix J) is performed M times. By the above flow above, for example, the time step "dt" of the large loop can be set to a relatively large value. For example, a high-speed calculation is possible.

Thus, in one example of the embodiment, the second variable update above (step S120) includes the first sub-update (step S121) and the second sub-update (step S122).

The first sub-update (step S121) includes updating the ith entry of the second variable $y_i$ by adding the second function to the ith entry of the second variable $y_i$ before the first sub-update. The second sub-update (step S122) includes updating the ith entry of the second variable $y_i$ by adding the third function to the ith entry of the second variable $y_i$ before the second sub-update. Even in such a case, the second function is independent of the second variable set {y}. The third function is independent of the second variable set {y}.

For example, the second sub-update is performed after alternately performing the first variable update and the first sub-update M times (M being an integer of 1 or more). Or, the first variable update and the first sub-update are performed alternately M times after the second sub-update. The order of performing the first variable update and the first sub-update alternately is interchangeable.

The third function includes, for example, the product-sum operation of at least a part of the first parameter set {J} above and at least a part of the first variable set {x} above.

In one example, the number of real roots of the fourth function after repeating the above processing procedure is 2 or more. One of the roots of the fourth function after repeating the processing procedure is positive. Another one of the roots of the fourth function after repeating the processing procedure is negative. For example, the processor 20 (referring to FIG. 1) outputs the sign (i.e., ±1) of the ith entry of the first variable $x_i$ obtained after repeating the processing procedure.

As described above, the second function may include the ith entry of the second parameter $h_i$. The ith entry of the second parameter $h_i$ is one of the second parameter set {h}.

In the embodiment, the processor 20 reads the data stored in the storage 10, updates the data, and stores the updated data in the storage 10.

For example, the first variable update (step S110) includes acquiring, from the storage 10, the ith entry of the first variable $x_i$ before the first variable update and storing, in the storage 10, the ith entry of the first variable $x_i$ after the first variable update. The second variable update (step S120) includes acquiring, from the storage 10, the ith entry of the second variable $y_i$ before the second variable update and storing, in the storage 10, the ith entry of the second variable $y_i$ after the second variable update.

For example, the first variable update may further include acquiring the ith entry of the second variable $y_i$ from the storage 10, calculating the first function, and updating the ith entry of the first variable $x_i$ to the ith entry of the first variable $x_i$ by adding the first function to the ith entry of the first variable $x_i$. For example, the second variable update may further include acquiring the ith entry of the first variable $x_i$ from the storage 10, calculating the second function, acquiring, from the storage 10, at least a part of the first parameter set {J} above and at least a part of the first variable set {x} above, calculating the third function, and updating the ith entry of the second variable $y_i$ by adding the second function and the third function to the ith entry of the second variable $y_i$.

In the embodiment, for example, in the case where the matrix J is a sparse matrix, a sparse matrix compression format may be used. For example, the COO (the coordinate) format, the CSR (compressed sparse row) format, or the like is applicable as the sparse matrix compression format. For example, the memory size can be conserved by using the sparse matrix compression format. For example, the product-sum operation of the matrix J and the first variable x can be performed quickly by using the sparse matrix compression format.

Examples of the constant "c" will now be described. For example, the detuning "D" is set to be larger than c times a maximum eigenvalue $\lambda_{max}$ of the matrix J (e.g., referring to Non-Patent Literature 2). In the case where "D" is too large, unnecessary calculation time arises. Therefore, for example, "D" is set to be substantially equal to c times $\lambda_{max}$. In such a case, $c=D/\lambda_{max}$. On the other hand, in one example, the matrix J is a real symmetric matrix. In such a case, $\lambda_{max}$ is substantially the same as $2\sigma \times N^{1/2}$ when the size of the matrix J is sufficiently large. This relationship is based on the Wigner semicircle distribution of a random matrix. "σ" is the standard deviation of the nondiagonal entries of the matrix J. In such a case, it is sufficient to set $c=D/(2\sigma \times N^{1/2})$. Calculation examples in such a case are described below.

As a method for increasing the accuracy in the embodiment, it is considered that the function used as the nonlinear function above can be modified. For example, the functions of the following ninth formula and tenth formula may be used.

[Formula 9]
$$\frac{dx_i}{dt} = Dy_i \quad (9)$$

[Formula 10]
$$\frac{dy_i}{dt} = \{[-D + p(t)](1 + x_i^n) - Kx_i^{n+2}\}x_i - ch_i a(t) + c\sum_{j=1}^{N} J_{i,j} x_j \quad (10)$$

In the tenth formula, "n" is an even number of two or more. By using such a function, for example, the accuracy of the solution of the Ising problem can be increased.

The above algorithm that is performed by the calculating device 110 according to the embodiment can be performed using various configurations. The calculating device 110 may include, for example, a PC cluster. The calculating device 110 may include, for example, a GPU (Graphics Processing Unit). The calculating device 110 may include, for example, a dedicated circuit. The dedicated circuit may include, for example, at least one of a FPGA (field-programmable gate array), a gate array, or an ASIC (application specific integrated circuit). The calculating device 110 may include, for example, a parallel digital calculating device.

FIG. 7 to FIG. 10 are flowcharts illustrating parts of the operation of the calculating device according to the embodiment.

These drawings show other examples of step S210. As shown in these drawings, step S110 and step S121 of the examples of FIG. 3 to FIG. 6 may be interchanged with each other.

Figure 11:
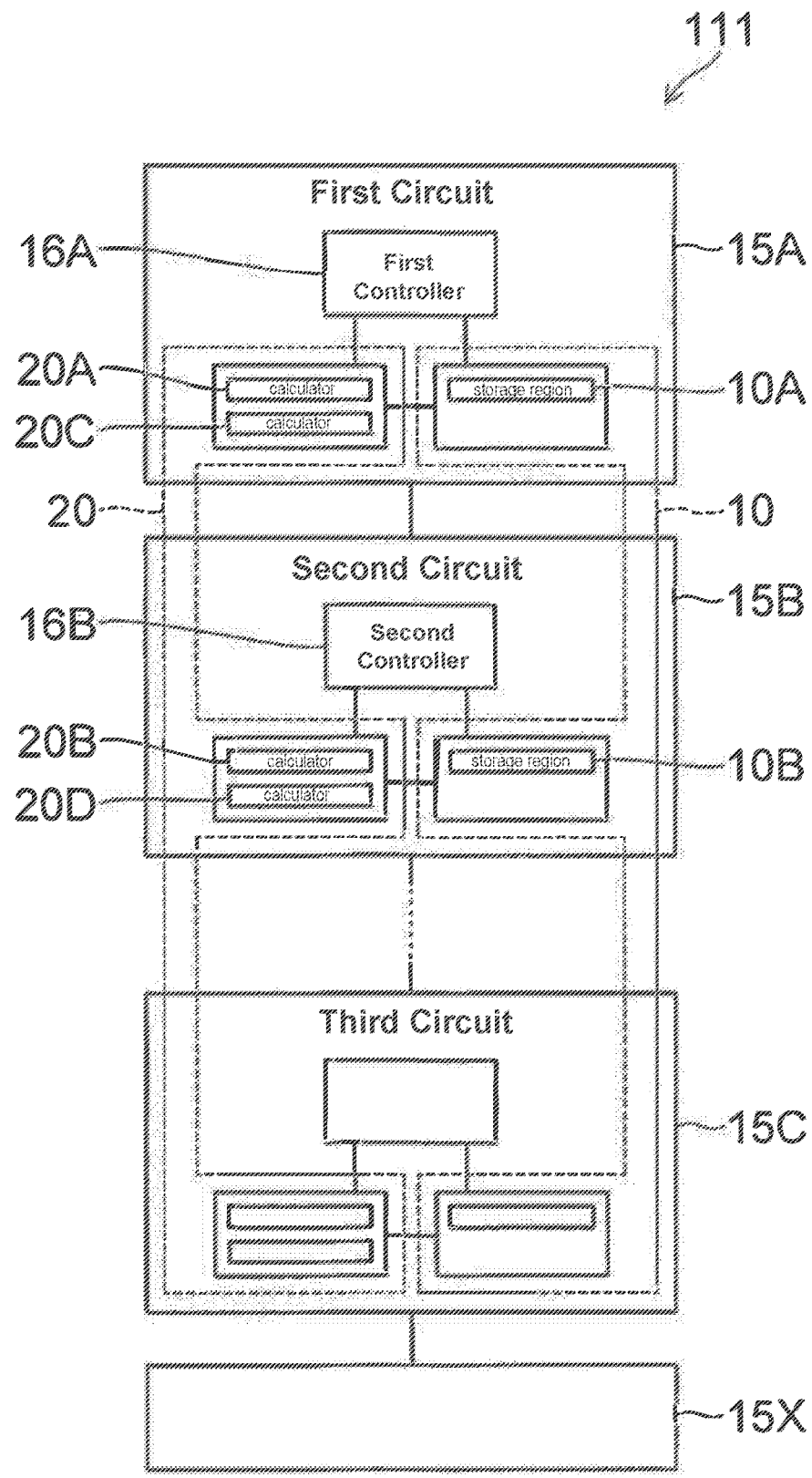
FIG. 11 is a schematic view showing an example of a calculating device according to the embodiment.

FIG. 11 is a schematic view showing an example of a calculating device according to the embodiment.

As shown in FIG. 11, the calculating device 111 according to the embodiment includes multiple circuits (a first circuit 15A, a second circuit 15B, a third circuit 15C, etc.). For example, each of these multiple circuits is one computer. For example, each of these multiple circuits may be one semiconductor circuit. These multiple circuits can communicate with one another (e.g., the transmission and reception of data). A control circuit part 15X is further provided in the calculating device 111. The communication of the multiple circuits is controlled by the control circuit part 15X.

For example, a processor and a storage (memory) are provided in each of the multiple circuits. Also, a controller may be provided.

Parallel computations are performed by the multiple circuits (the first circuit 15A, the second circuit 15B, the third circuit 15C, etc.). The number of the multiple circuits is arbitrary.

For example, a first calculator 20A and a first storage region 10A are provided in the first circuit 15A. In the example, the first circuit 15A further includes a first controller 16A. A second calculator 20B and a second storage region 10B are provided in the second circuit 15B. In the example, the second circuit 15B further includes a second controller 16B. Such a configuration is provided also in the third circuit 15C.

The processor 20 includes the above multiple calculators (the first calculator 20A, the second calculator 20B, etc.). For example, the first calculator 20A performs a part of the calculation of the third function. The second calculator 20B performs another part of the calculation of the third function. At least a part of these calculations is performed in parallel. For example, at least a part of performing the above part of the calculation of the third function in the first calculator 20A and at least a part of performing the other part of the calculation of the third function in the second calculator 20B are performed simultaneously. The speed of the calculations can be increased by the parallel computation. The calculation of the third function is computation-intensive. Therefore, speedup is realized effectively by parallelization of the calculation of the third function.

In the parallel computation, for example, the first calculator 20A stores, in the first storage region 10A, a part of the first parameter set {J} that is necessary for performing the part of the calculation of the third function. Thus, the processing and storing necessary for the part of the calculation of the third function are performed inside the first circuit 15A. On the other hand, the second calculator 20B stores, in the second storage region 10B, another part of the first parameter set {J} necessary for performing the other part of the calculation of the third function. Thus, the processing and the storing necessary for the other part of the calculation of the third function are performed inside the second circuit 15B.

For example, the first parameter set {J} includes a first calculation part and a second calculation part. The first calculation part is used in the part of the calculation of the third function. The second calculation part is used in the other part of the calculation of the third function. The first calculator 20A stores the first calculation part above in the first storage region 10A. The second calculator 20B stores the second calculation part above in the second storage region 10B.

In the embodiment, the ith and jth ("j" being different from "i") first variable update and first sub-update (the update using the second function) may be parallel computations. In such a case, hereinbelow, a third calculator 20C and a fourth calculator 20D may be provided in the processor 20. The third calculator 20C is provided in the first circuit 15A. The fourth calculator 20D is provided in the second circuit 15B. These calculators are functional blocks. The processing that is performed by at least a part of the third calculator 20C may be performed by at least a part of the first calculator 20A. The processing that is performed by at least a part of the fourth calculator 20D may be performed by at least a part of the second calculator 20B.

For example, the third calculator 20C performs a part of the calculation of the first variable update and a part of the calculation (the first sub-update) of the second function. The fourth calculator 20D performs another part of the calculation of the first variable update and another part of the calculation (the first sub-update) of the second function.

As described above, the first variable update includes updating the ith entry of the first variable $x_i$ by adding the first function to the ith entry of the first variable $x_i$ before the first variable update. Similarly, the first variable update further includes updating the jth entry of the first variable $x_j$ by adding the first function to the jth entry of the first variable $x_j$ (j being an integer not less than 1, not more than N, and different from i) before the first variable update. Here, the jth entry of the first variable $x_j$ is one of the first variable set {x}. The variable of the first function includes the jth entry of the second variable $y_j$. The jth entry of the second variable $y_j$ is one of the second variable set {y}.

For example, a part of the calculation of the first variable update includes the calculation of the update of the ith entry of the first variable $x_i$. Another part of the calculation of the first variable update includes the calculation of the update of the jth entry of the first variable $x_j$.

On the other hand, a part of the calculation of the second function includes the calculation of the second function having the ith entry of the first variable $x_i$ as a variable. Another part of the calculation of the second function includes the calculation of the second function having the jth entry of the first variable $x_j$ as a variable.

At least a part of performing a part of the calculation of the first variable update and a part of the calculation (the first sub-update) of the second function in the third calculator 20C and at least a part of performing another part of the calculation of the first variable update and another part of the calculation (the first sub-update) of the second function in the fourth calculator 20D may be performed simultaneously. The calculations can be done fast by using such a parallel computation.

Calculation examples of the calculating device according to the embodiment will now be described. In the following calculation examples, the calculation time does not include the time of setting the parameters. The calculation time corresponds to the time necessary to solve the differential equations after setting the parameters.

In a first calculation example, the calculations are performed by a PC cluster. In the first calculation example, the variables and the parameters are represented as "float" (32-bit floating-point numbers). The number of computing cores is denoted by "Q." "Q" is the divisor of N. Here we introduce L=N/Q.

A MPI (Message Passing Interface) is used when calculating the above algorithm in parallel using the PC cluster. The MPI is based on distributed memory parallel computing. In the MPI, each of the multiple computing cores processes one combination of L first split variables (x) and L second split variables (y).

For example, the ith computing core stores and performs the updates of $\{x_n|n=(i-1)L+1, \ldots, iL\}$ and $\{y_n|n=(i-1)L+1, \ldots, iL\}$.

The ith computing core can also store $\{h_n|n=(i-1)L+1, \ldots, IL\}$ and $\{J_{m,n}|m=(i-1)L+1, \ldots, iL; n=1, \ldots, N\}$. The update of $\{y_n|n=(i-1)L+1, \ldots, IL\}$ uses $\{h_n|n=(i-1)L+1, \ldots, iL\}$ and $\{J_{m,n}|m=(i-1)L+1, \ldots, iL; n=1, \ldots, N\}$.

For example, all entries of $\{x_n|n=1, \ldots, N\}$ are used in the update of each of $\{y_n|n=(i-1)L+1, \ldots, IL\}$. For example, the information of $\{x_n|n=1, \ldots, N\}$ is supplied to all of the computing cores by an Allgather function. In other words, the information (the data) is shared.

In the embodiment, communication is performed between the multiple computing cores. In other words, the transmission and reception of the data is performed. The communication relating to $\{y_n|n=(i-1)L+1, \ldots, IL\}$ and the communication relating to $\{J_{m,n}|m=(i-1)L+1, \ldots, iL; n=1, \ldots, N\}$ are unnecessary.

For example, a method may be considered in which the product-sum operation of the first parameter set {J} and the first variable set {x} is split and performed in parallel without performing the communication relating to the first variable set {x}; the results are communicated; and the update of the second variable set {y} is performed. In this method, the product-sum operation of the first parameter set {J} and the first variable set {x} is split and performed.

Examples of calculations in the case where N=2000 (the first calculation example) and the case where N=100000 (a second calculation example) will now be described.

As the first calculation example (the case of N=2000), the calculation example of the "$K_{2000}$" problem (referring to Non-Patent Literature 1) will be described. The "$K_{2000}$" problem is a fully-connected Ising model in which N=2000. The nondiagonal entries of the matrix J are one of ±1. The entries of the vector h all are zero. Accordingly, the calculations of the terms including the vector h are not performed.

In such a case, the standard deviation σ of the nondiagonal entries of the matrix J is 1. Therefore, "c" is set to $c_0$=D/($2N^{1/2}$). The actual maximum eigenvalue of the matrix J in the "$K_{2000}$" problem is 88.813324. On the other hand, the theoretical value of random matrix theory is $2\sigma N^{1/2}$=89.442719; and these values are extremely close to each other.

In the first calculation example described below, Q=25; dp*(T/dt)=D=2; and T=50.

In the case where M=1 and dt=0.25 in the embodiment, the calculation time is 7.6 ms. The average value of the Ising energy obtained at this time for 100 times is about −66086. This value corresponds to the "cut number" of 32523 (referring to the eleventh formula, the twelfth formula, and Non-Patent Literature 1). A large "cut number" corresponds to a high accuracy.

In the case where M=5 and dt=0.5 in the embodiment, the calculation time is 4.1 ms. The average value of the Ising energy obtained at this time for 100 times is about −66137. This value corresponds to the "cut number" of 32549. In the case of M=5, "dt" can be 2 times "dt" in the case of M=1. The calculation time in the case of M=5 is about half of the calculation time in the case of M=1. Faster calculations are possible.

On the other hand, according to Non-Patent Literature 1, the average value of the "cut number" for 100 times at 5 ms in a coherent Ising machine (referring to Non-Patent Literature 1) is 32457. On the other hand, according to Non-Patent Literature 1, the average value of the "cut number" for 100 times at 50 ms in the simulated annealing is 32314. Thus, by the calculation according to the embodiment, a solution having higher accuracy is obtained in a shorter time than in a coherent Ising machine and in simulated annealing.

Figure 12:
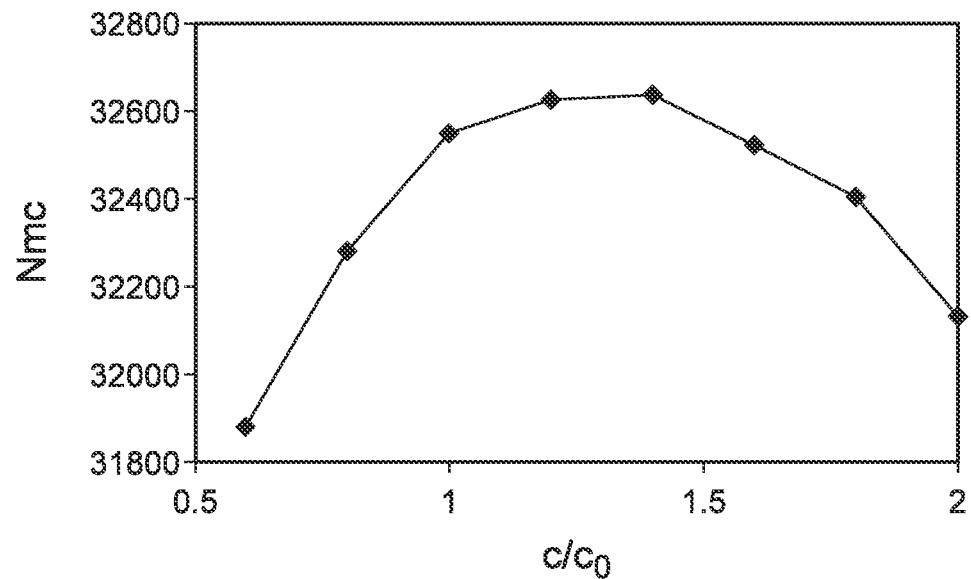
FIG. 12 is a graph illustrating a characteristic of the calculation according to the embodiment.

FIG. 12 is a graph illustrating a characteristic of the calculation according to the embodiment.

FIG. 12 shows an example of the relationship between "c" and the "cut number" obtained by the calculation. The vertical axis of FIG. 12 is "c/$c_0$." As described above, $c_0$=D/($2N^{1/2}$). The vertical axis of FIG. 12 is a cut number Nmc. The cut number Nmc is represented by the following eleventh formula and twelfth formula.

[Formula 11]
$$Nmc = \frac{Nmc0 - E_{Ising}}{2} \quad (11)$$

[Formula 12]
$$Nmc0 = -\frac{1}{2}\sum_{i=1}^{N}\sum_{j=1}^{N} J_{i,j} \quad (12)$$

As shown in FIG. 12, a large cut number Nmc is obtained when "c/$c_0$" is not less than about 1 and not more than about 1.5.

A second calculation example (the case of N=100000) will now be described. In the second calculation example, the nondiagonal entries of the matrix J and the entries of the vector h are set using "random numbers." As the "random numbers," values of −1 to 1 are set uniformly. The standard deviation σ of the nondiagonal entries of the matrix J in such a case is 1/($3^{1/2}$). Therefore, c is set to c=$3^{1/2}$D/($2N^{1/2}$). For the other parameters, Q=1250; dp*(T/dt)=D=2; T=50; dt=0.5; and M=5.

Figure 13:
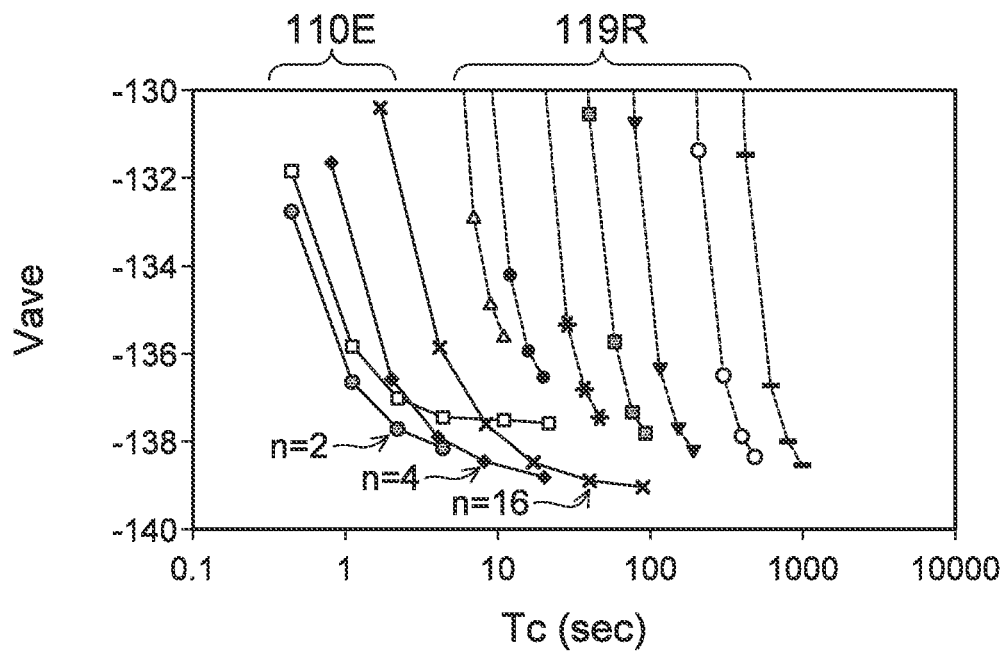
FIG. 13 is a graph illustrating the calculation results.

FIG. 13 is a graph illustrating the calculation results.

FIG. 13 shows the results of the second calculation example for the calculation according to the embodiment, and the results of the second calculation example for a calculation according to a reference example. The horizontal axis of FIG. 13 is a calculation time Tc (seconds). The vertical axis is an average value Vave of the Ising energy for 100 times. A calculation result 110E according to the embodiment and a calculation result 119R of the reference example are shown in FIG. 13. The number of computing cores is 1250 in these calculation examples.

For the calculation result 110E according to the embodiment, "n" shows the value of "n" in the tenth formula in the case where the nonlinear function of the tenth formula is used. For the calculation result 110E, the curve for which "n" is not assigned corresponds to the case where the seventh formula is used.

A calculation using simulated annealing is performed for the calculation result 119R of the reference example. In the simulated annealing, parallel computation of the energy change due to the spin flip is performed using an MPI. In these calculations, the inverse temperature is increased linearly. The increase rates are different between the multiple curves of the calculation result 119R of the reference example.

It can be seen from FIG. 13 that the final average value Vave is low (absolute value is large) for the calculation result 110E according to the embodiment. On the other hand, in the calculation results of the reference example, the final average value Vave is insufficiently low (the absolute value is insufficiently large). Thus, a calculation result that has high accuracy is obtained in the embodiment. According to the embodiment, compared to the reference example (the simulated annealing), the calculation time Tc necessary to obtain the same accuracy is 1/10 or less. Compared to the reference example, the calculation according to the embodiment is at least 10 times faster.

A third calculation example of the calculation according to the embodiment will now be described. In the third calculation example, the above calculation is performed using a GPU. In the calculation, for example, the variables and the parameters are represented as "float" (32-bit floating-point numbers).

In this method, the first variable set {x}, the second variable set {y}, the first parameter set {J}, and the second parameter set {h} are defined as the device variables. The first parameter set {J} is the matrix J. The update of the second variable y using the product-sum operation of the matrix J and the first variable x is performed using a matrix-vector product function. For the other updates relating to the first variable x and the second variable y, the updates of the ith entries ($x_i$ and $y_i$) are performed in one thread.

In the third calculation example, the "$K_{2000}$" problem is calculated using one GPU and using conditions similar to those of the first calculation example. The calculation time of the third calculation example is 14.7 ms; and the average value of the "cut number" for 100 times is 32549. In the third calculation example as well, the calculation can be faster than the result of the simulated annealing of the reference example.

Second Embodiment

A second embodiment includes a circuit in which the calculation described in reference to the first embodiment is possible.

Third Embodiment

The third embodiment relates to a calculation program. The calculation program causes the computer to repeat a processing procedure. The processing procedure includes the first variable update and the second variable update.

The first variable update includes updating the ith entry of the first variable $x_i$ by adding the first function to the ith entry of the first variable $x_i$ before the first variable update (i being an integer not less than 1 and not more than N, and N being an integer of 2 or more). The ith entry of the first variable $x_i$ is one of the first variable set $\{x\}$. The variable of the first function includes the ith entry of the second variable $y_i$. The ith entry of the second variable $y_i$ is one of the second variable set $\{y\}$. The second variable update includes updating the ith entry of the second variable $y_i$ by adding the second function and the third function to the ith entry of the second variable $y_i$ before the second variable update. The variable of the second function includes the ith entry of the first variable $x_i$. The variable of the third function includes at least a part of the first parameter set $\{J\}$ and at least a part of the first variable set $\{x\}$. The calculation program causes the computer to output at least one of the ith entry of the first variable $x_i$ obtained after repeating the processing procedure or a function of the ith entry of the first variable $x_i$ obtained after repeating the processing procedure.

The processing described in reference to the first embodiment and the second embodiment is applicable to the calculation program according to the embodiment.

Fourth Embodiment

The fourth embodiment is a computer-readable recording medium. A program that causes the computer to repeat a processing procedure is recorded in the recording medium. The processing procedure includes the first variable update and the second variable update.

The first variable update includes updating the ith entry of the first variable $x_i$ by adding the first function to the ith entry of the first variable $x_i$ before the first variable update (i being an integer not less than 1 and not more than N, and N being an integer of 2 or more). The ith entry of the first variable $x_i$ is one of the first variable set $\{x\}$; and the variable of the first function includes the ith entry of the second variable $y_i$. The ith entry of the second variable $y_i$ is one of the second variable set $\{y\}$. The second variable update includes updating the ith entry of the second variable $y_i$ by adding the second function and the third function to the ith entry of the second variable $y_i$ before the second variable update. The variable of the second function includes the ith entry of the first variable $x_i$. The variable of the third function includes at least a part of the first parameter set $\{J\}$ and at least a part of the first variable set $\{x\}$. The program causes the computer to output at least one of the ith entry of the first variable $x_i$ obtained after repeating the processing procedure or a function of the ith entry of the first variable $x_i$ obtained after repeating the processing procedure.

The processing described in reference to the first embodiment and the second embodiment is applicable to the recording medium according to the embodiment.

Fifth Embodiment

The embodiment relates to a calculation method. The calculation method repeats a processing procedure. The processing procedure includes the first variable update and the second variable update.

The first variable update includes updating the ith entry of the first variable $x_i$ by adding the first function to the ith entry of the first variable $x_i$ before the first variable update (i being an integer not less than 1 and not more than N, and N being an integer of 2 or more). The ith entry of the first variable $x_i$ is one of the first variable set $\{x\}$. The variable of the first function includes the ith entry of the second variable $y_i$. The ith entry of the second variable $y_i$ is one of the second variable set $\{y\}$. The second variable update includes updating the ith entry of the second variable $y_i$ by adding the second function and the third function to the ith entry of the second variable $y_i$ before the second variable update. The variable of the second function includes the ith entry of the first variable $x_i$. The variable of the third function includes at least a part of the first parameter set $\{J\}$ and at least a part of the first variable set $\{x\}$.

The calculation method outputs at least one of the ith entry of the first variable $x_i$ obtained after repeating the processing procedure or a function of the ith entry of the first variable $x_i$ obtained after repeating the processing procedure.

For example, the above processing (the instructions) of the various information (the data) is executed based on a program (software). For example, the above processing of the various information is performed by a computer storing the program and reading the program.

The above processing of the various information may be recorded in a magnetic disk (a flexible disk, a hard disk, etc.), an optical disk (CD-ROM, CD-R, CD-RW, DVD-ROM, DVD±R, DVD±RW, etc.), semiconductor memory, or another recording medium as a program that can cause a computer to perform the execution.

For example, the information that is recorded in the recording medium can be read by a computer (or an embedded system). The recording format (the storage format) of the recording medium is arbitrary. For example, the computer reads the program from the recording medium and causes a CPU to execute the instructions described in the program based on the program. In the computer, the acquisition (or the reading) of the program may be performed via a network.

At least a part of the above processing of the information may be performed by various software operating on a computer (or an embedded system) based on a program installed in the computer from a recording medium. The software includes, for example, an OS (operating system), etc. The software may include, for example, middleware operating on a network, etc.

The recording medium of the embodiments also includes a recording medium to which a program obtained using a LAN, the Internet, or the like is downloaded and stored. The above processing may be performed based on multiple recording media.

The computer according to the embodiments includes one or multiple devices (e.g., personal computers, etc.). The computer according to the embodiments may include multiple devices connected by a network.

According to the embodiments, a calculating device, a calculation program, a recording medium, and a calculation method can be provided in which an optimization problem can be calculated quickly.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in calculation devices such as processors, acquisition parts, stores, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all calculation devices, calculation programs, recording mediums and calculation methods practicable by an appropriate design modification by one skilled in the art based on the calculation devices, the calculation programs, and the recording mediums, and the calculation methods described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A calculating device, comprising:
a processor configured to execute a processing procedure, the processing procedure including an update of first variables and an update of second variables,
the processor being configured to solve equations of a motion for a Hamiltonian-dynamical-system having a Hamiltonian by a parallel computation, the first variables and the second variables being separated from each other in the Hamiltonian, and
the processor being configured to output values of at least one of the first variables obtained after the processing procedure or a function of the first variables obtained after the processing procedure,
the processor including a first circuit and a second circuit coupled in parallel,
the first circuit being configured to update the first variables,
the second circuit being configured to update the second variables, and
at least a part of the update of the first variables in the first circuit and at least a part of the update of the second variables in the second circuit being performed in parallel.

2. The device according to claim 1, wherein
the values correspond to a solution of a combinatorial optimization problem.

3. The device according to claim 2, wherein
the first variables correspond to discrete variables of the combinatorial optimization problem, and
the solution corresponds to a ground state of an energy relating the combinatorial optimization problem.

4. The device according to claim 3, wherein
the energy includes a first function of the discrete variables, and
the Hamiltonian includes the first function in which the discrete variables are replaced by the first variables.

5. The device according to claim 1, wherein
the processor being configured to perform the update of the second variables after the update of the first variables, or to perform update of the first variables after the update of the second variables in the processing procedure.

6. A computer-implemented method, comprising:
performing a processing procedure by a processor, the processing procedure including an update of first variables and an update of second variables;
solving equations of a motion for a Hamiltonian-dynamical-system having a Hamiltonian by a parallel computation, the first variables and the second variables being separated from each other in the Hamiltonian; and
outputting values of at least one of the first variables obtained after the processing procedure or a function of the first variables obtained after the processing procedure,
wherein
the processor includes a first circuit and a second circuit coupled in parallel,
the first circuit is configured to update the first variables,
the second circuit is configured to update the second variables, and
at least a part of the update of the first variables in the first circuit and at least a part of the update of the second variables in the second circuit are performed in parallel.

7. The computer-implemented method according to claim 6, wherein
the values correspond to a solution of a combinatorial optimization problem.

8. The computer-implemented method according to claim 7, wherein
the first variables correspond to discrete variables of the combinatorial optimization problem, and
the solution corresponds to a ground state of an energy relating the combinatorial optimization problem.

9. The computer-implemented method according to claim 8, wherein
the energy includes a first function of the discrete variables, and
the Hamiltonian includes the first function in which the discrete variables are replaced by the first variables.

10. The computer-implemented method according to claim 6, wherein
the update of the second variables is performed after the update of the first variables, or the update of the first variables is performed after the update of the second variables in the processing procedure.

11. A non-transitory recording medium, the recording medium being computer-readable, a calculation program being recorded in the recording medium, the calculation program causing a processor to execute a processing procedure, the processing procedure including an update of first variables and an update of second variables, the calculation program is configured to cause the computer to solve equations of a motion for a Hamiltonian-dynamical-system having a Hamiltonian by a parallel computation, the first variables and the second variables being separated from each other in the Hamiltonian, and the calculation program is configured to cause the computer to output values of at least one of the first variables obtained after the processing procedure or a function of the first variables obtained after the processing procedure, wherein
the processor includes a first circuit and a second circuit coupled in parallel,
the first circuit is configured to update the first variables,
the second circuit is configured to update the second variables, and
at least a part of the update of the first variables in the first circuit and at least a part of the update of the second variables in the second circuit are performed in parallel.

12. The medium according to claim 11, wherein the values correspond to a solution of a combinatorial optimization problem.

13. The medium according to claim 12, wherein the first variables correspond to discrete variables of the combinatorial optimization problem, and the solution corresponds to a ground state of an energy relating the combinatorial optimization problem.

14. The medium according to claim 13, wherein the energy includes a first function of the discrete variables, and the Hamiltonian includes the first function in which the discrete variables are replaced by the first variables.

15. The medium according to claim 14, wherein the update of the second variables is performed after the update of the first variables, or the update of the first variables is performed after the update of the second variables in the processing procedure.

16. A calculation method, comprising
executing a processing procedure by a processor,
the processing procedure including an update of first variables and an update of second variables,
the method including solving equations of a motion for a Hamiltonian-dynamical-system having a Hamiltonian by a parallel computation, the first variables and the second variables being separated from each other in the Hamiltonian, and
the method including outputting values of at least one of the first variables obtained after the processing procedure or a function of the first variables obtained after the processing procedure,
wherein
the processor includes a first circuit and a second circuit coupled in parallel,
the first circuit is configured to update the first variables,
the second circuit is configured to update the second variables, and
at least a part of the update of the first variables in the first circuit and at least a part of the update of the second variables in the second circuit are performed in parallel.

17. The method according to claim 16, wherein the values correspond to a solution of a combinatorial optimization problem.

18. The method according to claim 17, wherein the first variables correspond to discrete variables of the combinatorial optimization problem, and the solution corresponds to a ground state of an energy relating the combinatorial optimization problem.

19. The method according to claim 18, wherein the energy includes a first function of the discrete variables, and the Hamiltonian includes the first function in which the discrete variables are replaced by the first variables.

20. The method according to claim 19, wherein the update of the second variables is performed after the update of the first variables, or the update of the first variables is performed after the update of the second variables in the processing procedure.

* * * * *